United States Patent
Vivanco et al.

(10) Patent No.: US 9,198,078 B1
(45) Date of Patent: Nov. 24, 2015

(54) MANAGING SIGNALING OVERHEAD IN A WIRELESS MULTICAST SYSTEM

(71) Applicant: Sprint Spectrum LP, Overland park, KS (US)

(72) Inventors: Daniel Vivanco, Sterling, VA (US); Yu Zhou, Herndon, VA (US); Shahzada Rasool, Vienna, VA (US); Muhammad Ahsan Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 162 days.

(21) Appl. No.: 14/103,810

(22) Filed: Dec. 11, 2013

(51) Int. Cl.
*H04L 12/26* (2006.01)
*H04W 28/02* (2009.01)
*H04W 4/06* (2009.01)
*H04L 1/18* (2006.01)

(52) U.S. Cl.
CPC ......... *H04W 28/0289* (2013.01); *H04L 1/1825* (2013.01); *H04L 1/1896* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 8,289,895 B2 | 10/2012 | Yu et al. | |
| 8,675,616 B2 * | 3/2014 | Herrmann | 370/338 |
| 2004/0071128 A1 * | 4/2004 | Jang et al. | 370/349 |
| 2007/0002786 A1 * | 1/2007 | Herrmann | 370/328 |
| 2010/0177717 A1 * | 7/2010 | Sung et al. | 370/329 |
| 2011/0099446 A1 * | 4/2011 | Murakami | 714/748 |
| 2012/0020275 A1 * | 1/2012 | Wei | 370/312 |
| 2013/0265948 A1 * | 10/2013 | Lee | 370/329 |
| 2013/0301515 A1 * | 11/2013 | Kim et al. | 370/312 |
| 2014/0044053 A1 * | 2/2014 | Kimura | 370/328 |

* cited by examiner

*Primary Examiner* — Michael J Moore, Jr.

(57) ABSTRACT

At least one retransmission request is received from each of a plurality of wireless devices receiving a multicast broadcast, and a number of retransmission requests received from each of the plurality of wireless devices is determined. A first group of wireless devices is selected from among the plurality of wireless devices, and a delay time is determined for each wireless device in the first group based on the respective number of retransmission requests from each wireless device. When a data packet is not received at the one or more wireless devices of the first group, a timer is started at each of the wireless devices of the first group using the respective delay times. When the shortest delay time expires, another retransmission request is received from the wireless device comprising the shortest delay time of the one or more wireless devices.

19 Claims, 6 Drawing Sheets

US 9,198,078 B1

MANAGING SIGNALING OVERHEAD IN A WIRELESS MULTICAST SYSTEM

TECHNICAL BACKGROUND

Multimedia Broadcast and Multicast Services (MBMS) is a point-to-multipoint service in which data is transmitted from an access node to multiple wireless devices. Applications of an MBMS system include audio, video, and multimedia broadcasts, emergency alerts, traffic announcements, map information to wireless devices in a similar geographic area, and the like.

A mechanism such as hybrid automatic repeat request (HARQ) protocol can be used in an MBMS system to improve transmission reliability over a wireless communication link. The HARQ protocol can enable retransmission requests to be sent by a receiving wireless device in the event that expected data is lost or is not decodable (for example, if the data is corrupted). However, HARQ retransmission requests increase data latency in the larger communication network because data is typically retransmitted until it is correctly decoded at a receiving wireless device.

Further, where data is lost or corrupted in an MBMS system, each receiving device which fails to receive the data may send a retransmission request, numerous wireless devices may transmit retransmission requests for the lost or corrupted data, potentially leading to congestion in both the uplink and downlink portions of a wireless communication link. Consequently, in many MBMS systems, mechanisms such as HARQ are disabled. While this reduces network congestion and signaling overhead, the broadcast data is more susceptible to errors introduced by wireless communication.

OVERVIEW

In systems and methods of managing signaling overhead in a wireless multicast system, a plurality of wireless devices is receiving a multicast broadcast from an access node. At least one retransmission request is received from each of the plurality of wireless devices, and a number of retransmission requests received from each of the plurality of wireless devices is determined. A first group of wireless devices is selected from among the plurality of wireless devices, and the first group comprises a second group and a third group of wireless devices. The number of retransmission requests of each of the wireless devices of the second group are within a first range, and the number of retransmission requests of each of the wireless devices of the third group are within a second range which is less than the first range. A delay time is determined for each wireless device in the first group based on the respective number of retransmission requests from each wireless device, where the smaller the number of retransmission requests, the greater the determined delay time. Subsequently, when it is determined that a data packet is not received at the one or more wireless devices of the first group, a timer is started at each of the wireless devices of the first group using the respective delay times. When the shortest delay time expires, another retransmission request is received from the wireless device comprising the shortest delay time of the one or more wireless devices.

DETAILED DESCRIPTION

Figure 1:
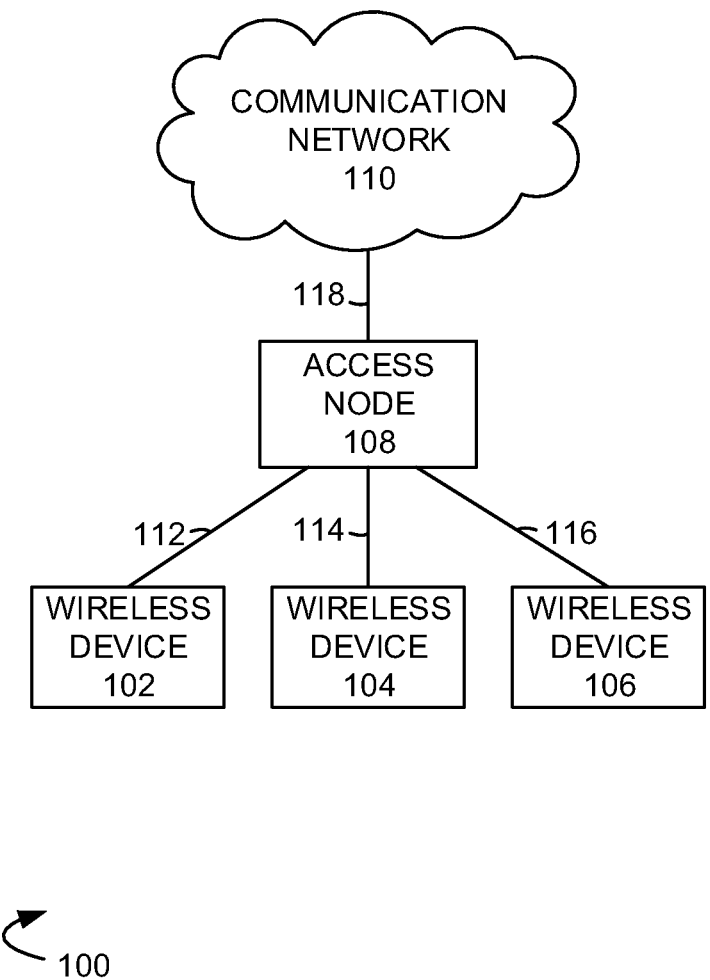
FIG. 1 illustrates an exemplary communication system to manage signaling overhead in a wireless multicast system.

FIG. 1 illustrates an exemplary communication system 100 to manage signaling overhead in a wireless multicast system comprising wireless devices 102, 104 and 106, access node 108, and communication network 110. Examples of wireless devices 102, 104 and 106 can comprise a cell phone, a smart phone, a computing platform such as a laptop, palmtop, or tablet, a personal digital assistant, or an internet access device, including combinations thereof. Wireless device 102 is in communication with access node 108 over communication link 112, wireless device 104 is in communication with access node 108 over communication link 114, and wireless device 106 is in communication with access node 108 over communication link 116. While only three wireless device are illustrated in FIG. 1, this is not a limitation, and a greater number of wireless devices can also communicate with access node 108 over a respective communication link.

Access node 108 is a network node capable of providing wireless communications to wireless devices 102-106, and can be, for example, a base transceiver station, a radio base station, an eNodeB device, or an enhanced eNodeB device. Access node 108 can communicate with each of wireless devices 102-106 using point-to-multipoint communications, such as an MBMS broadcast, as well as using bidirectional point-to-point communications, such as unicast communications. Access node 108 is in communication with communication network 110 over communication link 118. Access node 108 and each of wireless devices 102-106 may communicate both bearer data and signaling data with each other using one or more logical channels of communication links 112, 114 and 116, respectively.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other data, for example, to support communications by a wireless device such as wireless devices 102-106. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116 and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 108 and communication network 110 which are omitted for clarity, including additional processing nodes, routers, gateways, and physical and/or wireless data links for carrying data among the various network elements.

In a point-to-multipoint transmission system, such as an MBMS system, a mechanism such as hybrid automatic repeat request (HARQ) protocol can be used to improve transmission reliability over a wireless communication link. In the event that expected data is lost or is not decodable (for example, if the data is corrupted), the retransmission mechanism can enable retransmission requests to be sent by wireless devices 102-106. However, HARQ retransmission requests increase data latency in the communication system because data is typically retransmitted until it is correctly decoded at a receiving wireless device.

Further, owning to the point-to-multipoint nature of data transmission in an MBMS system, where data is lost or corrupted, each receiving device which fails to receive the data may send a retransmission request. Thus, numerous wireless devices may transmit retransmission requests for the data, which can give rise to congestion in both the uplink and downlink portions of a wireless communication link as well as in other portions of communication system 100. Consequently, in many MBMS systems, mechanisms such as HARQ are disabled. While this reduces network congestion and signaling overhead, the broadcast data is more susceptible to errors introduced by wireless communication.

In order to obtain the reliability of retransmission requests while reducing signaling overhead in communication system 100, where a plurality of wireless devices 102-106 is receiving a multicast broadcast from access node 108, at least one retransmission request is received from each of the plurality of wireless devices 102-106, and a number of retransmission requests received from each of the plurality of wireless devices is determined. A first group of wireless devices is selected from among the plurality of wireless devices, the first group comprising a second group of wireless devices and a third group of wireless device, wherein the number of retransmission requests of each of the wireless devices of the second group are within a first range, and the number of retransmission requests of each of the wireless devices of the third group are within a second range which is less than the first range. In an embodiment, the second group can comprise a representative group of wireless devices, each wireless device having sent a number of retransmission requests which is neither the largest nor the smallest number of retransmission requests. A delay time is determined for each wireless device in the first group (i.e., the group that comprises the second and third groups) based on the respective number of retransmission requests from each wireless device, wherein the delay time determined for each of wireless devices increases as the number of retransmission requests from decreases. When it is determined that a data packet is not received at the one or more wireless devices, a timer is started at each wireless device which did not receive the data packet using the delay time determined for each wireless device. When the shortest delay time expires, the wireless device comprising the shortest delay time sends a retransmission request. The data packet is then retransmitted to each of the plurality of wireless devices. When a wireless device receives the data packet before its timer has run (i.e., during the delay time determined for that wireless device), then that wireless device does not send a retransmission request for that data packet.

Figure 2:
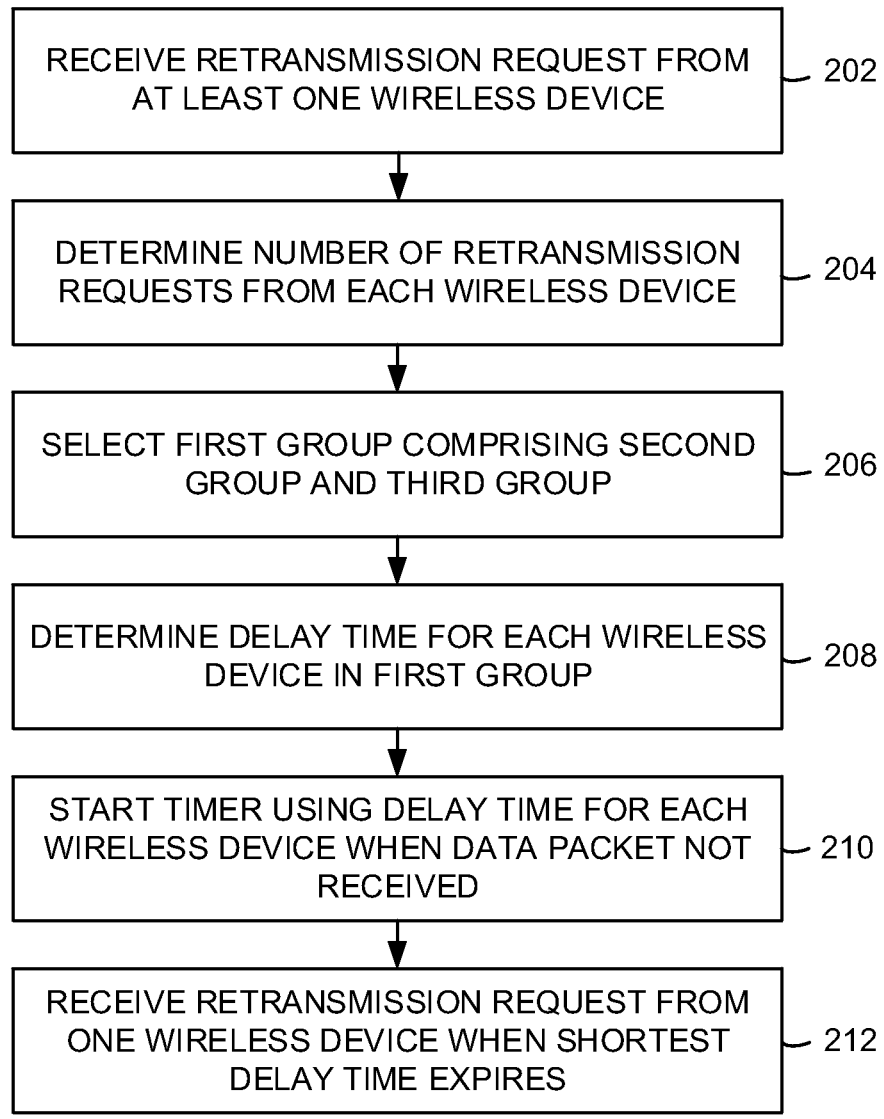
FIG. 2 illustrates an exemplary method of managing signaling overhead in a wireless multicast system.

FIG. 2 illustrates an exemplary method of managing signaling overhead in a wireless multicast system. In operation 202, at least one retransmission request is received from each of a plurality of wireless devices, wherein the plurality of wireless devices is receiving a multicast broadcast from an access node. For example, wireless device 102-106 can each receive a multicast broadcast, such as an MBMS broadcast, from access node 108. When wireless device 102 (or 104 or 106) determines that an expected data packet has not been received, or that the expected data packet has been received but cannot be properly decoded (due to, e.g., corruption of the data packet), the wireless device can send a retransmission request to access node 108 requesting retransmission of the data packet.

Figure 3:
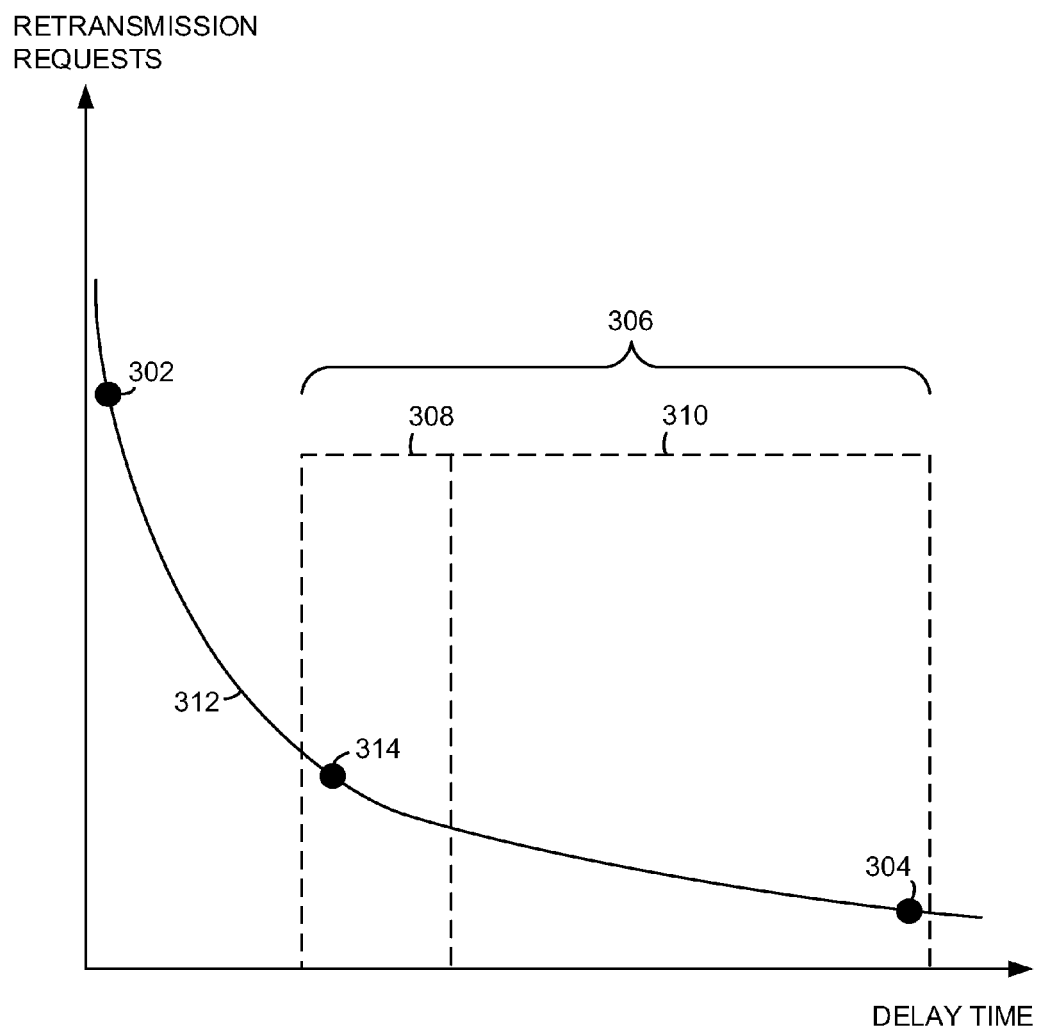
FIG. 3 illustrates an exemplary plot of retransmission requests received from wireless devices.

A number of retransmission requests from each of the plurality of wireless devices is determined (operation 204). For example, each of wireless devices 102, 104 and 106 can transmit a plurality of retransmission requests to access node 108. The number of retransmission requests sent by each wireless device may differ, for example, due to wireless communication link conditions such as data delay or data jitter (i.e., uneven data flows, or so-called "burstiness" of a data flow), distance from access node 108, radio frequency interference affecting communication link throughput, fading conditions, mobility of the wireless device, and the like. For example, referring to FIG. 3, distribution 312 comprises a distribution of a number of retransmission requests sent by a plurality of wireless devices. Wireless device 302 may send a relatively large number of retransmission requests, and wireless device 304 may send comparatively fewer retransmission requests. Wireless device 302 may send a greater number of retransmission requests than wireless device 314, and wireless device 314 may send a greater number of retransmission requests than wireless device 304. While only three wireless devices are illustrated in FIG. 3, it will be understood that a greater number of wireless devices can send retransmission requests, and that distribution 312 can represent a distribution of numbers of received retransmission requests from the greater number of wireless devices.

Returning to FIG. 2, from among the plurality of wireless devices, a first group of wireless devices is selected, the first group comprising a second group of wireless devices and a third group of wireless device, wherein the number of retransmission requests of each of the wireless devices of the second group are within a first range, and the number of retransmission requests of each of the wireless devices of the third group are within a second range which is less than the first range (operation 206). For example, first group 306 (FIG. 3) can comprise second group 308 and third group 310. Second group 308 includes wireless devices each comprising a larger number of retransmission requests than each of the wireless devices in third group 310.

Referring to FIG. 2, a delay time is then determined for each wireless device in the first group based on the respective number of retransmission requests from each wireless device, wherein the delay time increases as the number of retransmission requests decreases (operation 208). For example, for each wireless device in first group 306 (FIG. 3) a delay time is determined. As illustrated in FIG. 3, the delay time determined for wireless device 314 is shorter than the delay time determined for wireless device 304.

Returning to FIG. 2, when it is determined that a data packet is not received at one or more wireless devices of the first group, a timer is started at the one or more wireless devices of the first group using the delay time determined for each of the respective one or more wireless devices (operation 210). For example, it can be determined that a data packet is not received by wireless devices 304 and 314. Because wireless devices 304 and 314 are both receiving a multicast transmission, each of wireless devices 304 and 314 expect to receive versions of the same data packet (i.e., a substantially identical copy of a data packet of the information being transmitted in the multicast transmission). The data packet to each wireless device can be lost over a wireless communication link so that it does not arrive at a wireless device, or the data packet can be corrupted so that the data packet cannot be properly decoded at the receiving wireless device, and the like. When each of wireless devices 304 and 314 determines that the data packet has not been received, rather than immediately sending a retransmission request, each of wireless devices 304 and 314 starts a timer using the delay time determined for each wireless device. The delay time determined for wireless device 314 is shorter than the delay time determined for wireless device 304.

Referring again to FIG. 2, when the shortest delay time expires, another retransmission request is received from a wireless device comprising a shortest delay time of the one or more wireless devices (operation 212). For example, because the delay time determined for wireless device 314 is shorter than the delay time determined for wireless device 304, the timer of wireless device 314 will expire before the timer for wireless device 304. Wireless device 314 sends a retransmission request to its serving access node (e.g., access node 108) when its timer runs. Similarly, at the time when the delay time of wireless device 314 expires, the timer of wireless device 304 is still running, and thus wireless device 304 does not send a retransmission request.

Figure 4:
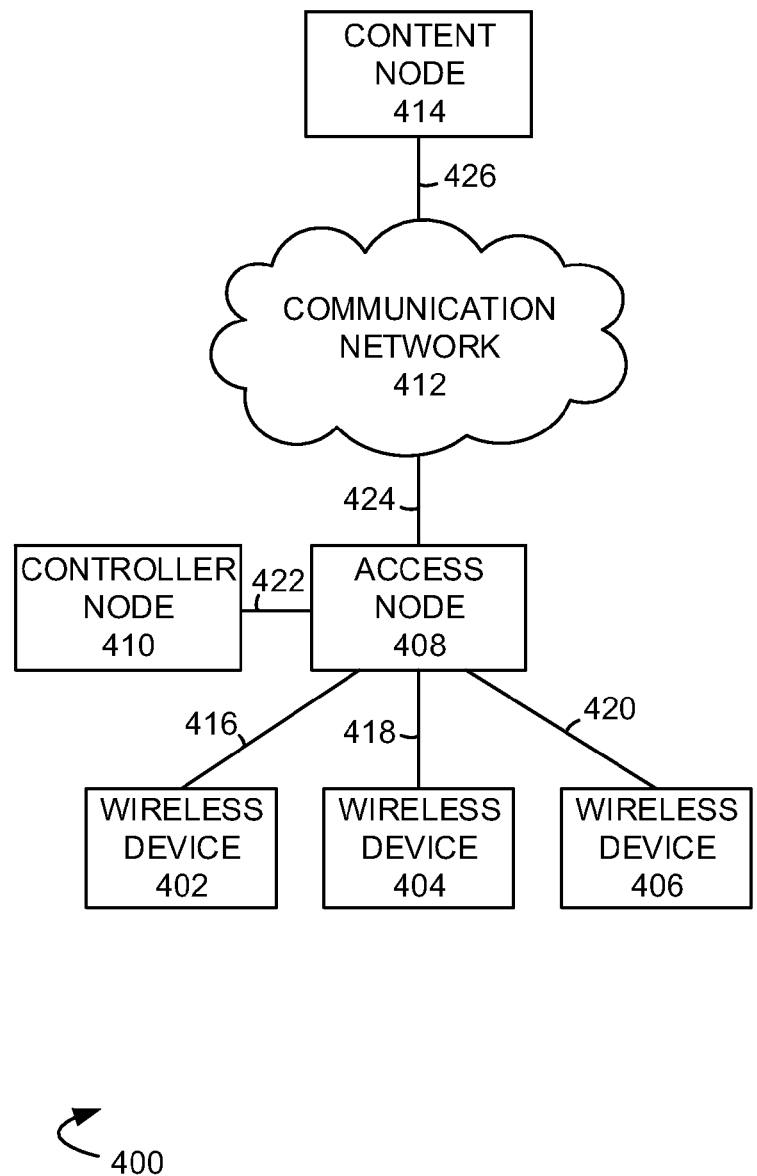
FIG. 4 illustrates another exemplary communication system to manage signaling overhead in a wireless multicast system.

FIG. 4 illustrates another exemplary communication system 400 to manage signaling overhead in a wireless multicast system comprising wireless devices 402, 404 and 406, access node 408, controller node 410, communication network 412, and content node 414. Examples of wireless devices 402, 404 and 406 can comprise a cell phone, a smart phone, a computing platform such as a laptop, palmtop, or tablet, a personal digital assistant, or an internet access device, including combinations thereof. Wireless device 402 is in communication with access node 408 over communication link 416, wireless device 404 is in communication with access node 408 over communication link 418, and wireless device 406 is in communication with access node 408 over communication link 420. While only three wireless device are illustrated in FIG. 4, this is not a limitation, and a greater number of wireless devices can also communicate with access node 408 over a respective communication link.

Access node 408 is a network node capable of providing wireless communications to wireless devices 402-406, and can be, for example, a base transceiver station, a radio base station, an eNodeB device, or an enhanced eNodeB device. Access node 408 can communicate with each of wireless devices 402-406 using point-to-multipoint communications, such as an MBMS broadcast, as well as using bidirectional point-to-point communications, such as unicast communications. Access node 408 is in communication with communication network 412 over communication link 424. Access node 408 and each of wireless devices 402-406 may communicate both bearer data and signaling data with each other using one or more logical channels of communication links 416-420, respectively.

Controller node 410 can comprise a processor and associated circuitry to execute or direct the execution of computer-readable instructions, and can be configured to control the setup and maintenance of a communication session over communication network 412 for wireless devices 402-406, as well as to maintain network connection information associated with wireless device 302. Controller node 410 can comprise a mobile switching center (MSC), a dispatch call controller (DCC), a mobility management entity (MME), or another similar network node. Controller node 410 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 410 can receive instructions and other input at a user interface. Controller node 410 is in communication with access node 408 over communication link 422.

Content node 414 can comprise a processor and associated circuitry to execute or direct the execution of computer-readable instructions, and can be configured to provide content to wireless devices 402-406. Examples of content can comprise audio, video, and/or multimedia content, including music, movies, videos, map data, weather reports, traffic alerts, public safety alerts, network condition reports, and the like. Content node 414 can comprise an element of a multicast transmission system configured to provide content for broadcast in a point-to-multipoint system. Content can be stored in a memory device of content node 414, in a memory device in communication with content node 414, in a memory device of another network element, and so forth. Content node 414 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Content node 414 can receive instructions and other input at a user interface. Examples of content node 414 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Content node 414 is in communication with communication network 412 over communication link 426.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 can be capable of carrying voice information and other data, for example, to support communications by a wireless device such as wireless devices 402-406. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 412 may also comprise a wireless network, including base stations, wireless communication nodes, telephony switches, internet routers, network gateways, computer systems, communication links, or some other type of communication equipment, and combinations thereof.

Communication links 416, 418, 420, 422, 424 and 426 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 408, controller node 410, content node 414, and communication network 412 which are omitted for clarity, including additional processing nodes, routers, gateways, and physical and/or wireless data links for carrying data among the various network elements.

Figure 5:
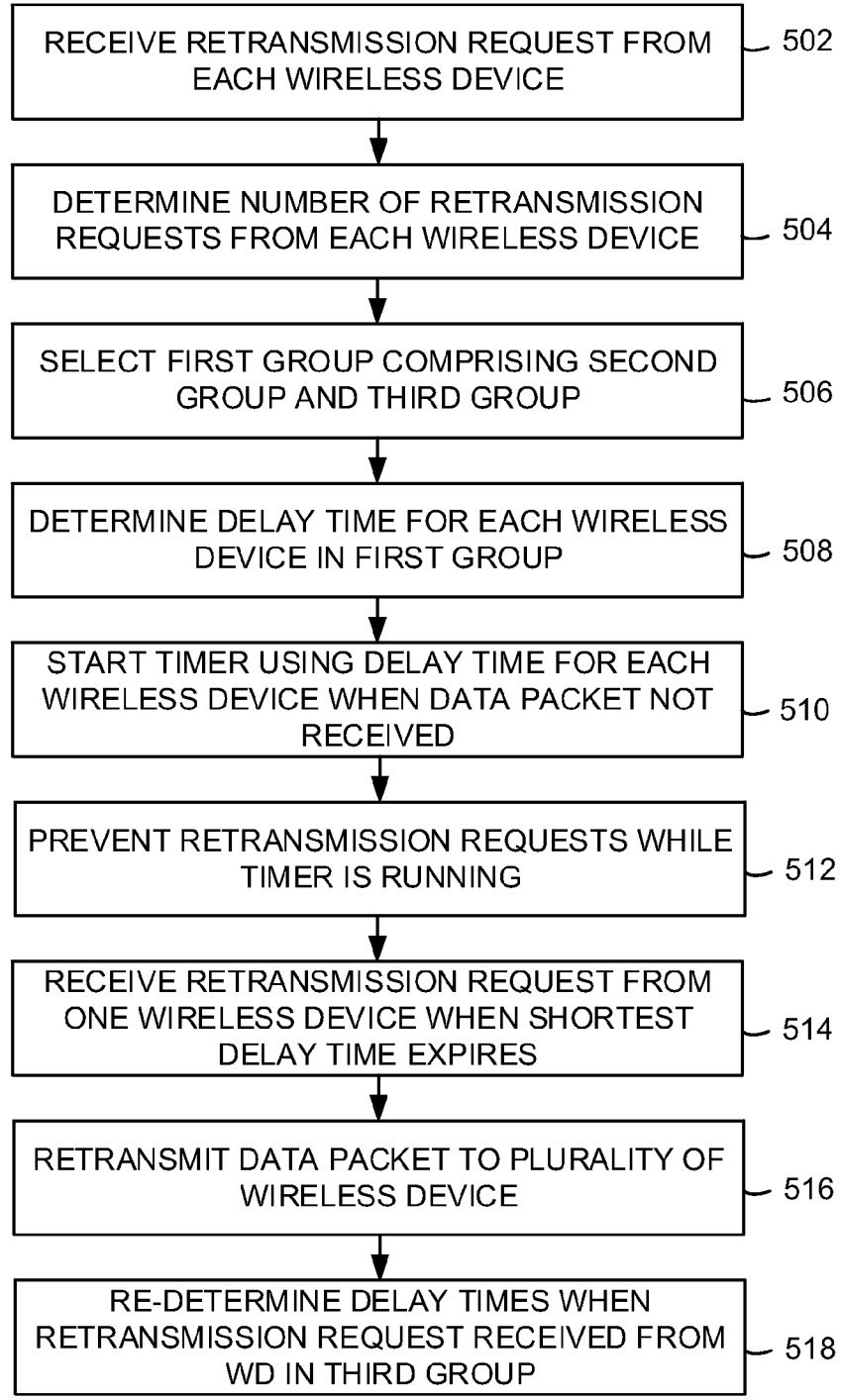
FIG. 5 illustrates another exemplary method of managing signaling overhead in a wireless multicast system.

FIG. 5 illustrates another exemplary method of managing signaling overhead in a wireless multicast system. In operation 502, at least one retransmission request is received from each of a plurality of wireless devices, wherein the plurality of wireless devices is receiving a multicast broadcast from an access node. For example, wireless device 402-406 can each receive a multicast broadcast, such as an MBMS broadcast, from access node 408. When wireless device 402 (or 404 or 406) determines that an expected data packet has not been received, or that the expected data packet has been received but cannot be properly decoded (due to, e.g., corruption of the data packet), the wireless device can send a retransmission request to access node 408 requesting retransmission of the data packet.

A number of retransmission requests from each of the plurality of wireless devices is determined (operation 504). For example, each of wireless devices 402, 404 and 406 can transmit a plurality of retransmission requests to access node 408. The number of retransmission requests sent by each wireless device may differ, for example, due to wireless communication link conditions such as data delay or data jitter (i.e., uneven data flows, or so-called "burstiness" of a data flow), distance from access node 408, radio frequency interference affecting communication link throughput, fading conditions, mobility of the wireless device, and the like. For example, wireless device 402 may send a relatively large number of retransmission requests, wireless device 404 may send fewer retransmission requests than wireless device 402, and wireless device 406 may transmit fewer retransmission requests than wireless device 404.

Next, a first group of wireless devices is selected from among the plurality of wireless devices, the first group comprising a second group of wireless devices and a third group of wireless device, wherein the number of retransmission requests of each of the wireless devices of the second group are within a first range, and the number of retransmission requests of each of the wireless devices of the third group are within a second range which is less than the first range (operation 506). The second group includes wireless devices each comprising a larger number of retransmission requests than each of the wireless devices in third group.

The second and third groups of wireless devices can also be selected based on an application requirement of an application running on each of the plurality of wireless devices. For example, an application requirement of an application running on a wireless device can be determined. The application requirement can comprise a minimum data rate, a maximum permitted data delay, a minimum throughput, a maximum error rate, a maximum data loss rate, and the like, of an application running on a wireless device, to provide a threshold level of application performance. The application requirement can also be determined based on the application type, such as whether the application is a relatively delay sensitive application (such as a streaming audio application a streaming video application, a voice application, and the like) or a relatively delay insensitive application (such as an email application, a messaging application, a web browsing application, and the like). The application requirement can further be based on its utilization or requested utilization of communication link resources, for example, an amount of data sent to or from the wireless device, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof. Further, the application requirement can be evaluated based on a traffic class indicator associated with bearer data being sent from the wireless device, such as a quality of service class indicator (QCI) or similar traffic class indicator. Thus, the second and/or third groups can be selected based on the number of retransmission requests sent by each wireless device, and a respective application requirement for each wireless device.

Additional factors can be considered when selecting the second and third groups of wireless devices, in addition to the number of retransmission requests sent by each wireless device. For example, conditions of a communication link between each wireless device and the access node (e.g., communication links 416, 418 and 420) can be considered, since as communication link conditions decrease, a number of retransmission requests from a wireless device can be expected to increase. In addition, a location and mobility of each of the plurality of wireless devices can be used in the selection of wireless devices for the second and third groups, since the farther a wireless device is located from a serving access node, the poorer the communication link and thus the greater the number of retransmission requests from a wireless device can be expected. Similarly, as a wireless device moves away from the access node due to mobility, the greater the number of retransmission requests from a wireless device can be expected.

A priority class of each of the plurality of wireless devices can also be taken into account when selecting wireless devices for the second and third groups. For example, a wireless device can be associated with a level of priority provisioned within communication system 400 for the wireless device, such as may be associated with a premium-level subscriber, an emergency responder, and the like. A higher priority wireless device may be selected for the second group over a wireless device associated with a lower provisioned priority level. Additionally, a traffic class indicator of data associated with the application running on each of the plurality of wireless devices, such as a quality of service (QoS) class indicator, can be taken into account when selecting wireless devices for the second and third groups. The higher the traffic class indicator, the more likely that a wireless device will be selected for the second group. Other factors can be considered when selecting wireless devices for the second and/or third groups, including combinations of the foregoing.

When selecting wireless device for the first group, in an embodiment, a threshold number of retransmission requests can be determined. Those wireless devices comprising a number of retransmission requests which meets the threshold number of retransmission requests can be selected from among the plurality of wireless devices for the first group.

Next, a delay time is then determined for each wireless device in the first group based on the respective number of retransmission requests from each wireless device, wherein the delay time increases as the number of retransmission requests decreases (operation 508). For example, a delay time can be determined for each of wireless devices 402-406.

The delay time can further be determined based on the application requirement of the application running on each of the plurality of wireless devices. For example, the more stringent the required minimum data rate, maximum permitted data delay, minimum throughput, maximum error rate, maximum data loss rate, and the like, of an application running on a wireless device to provide a threshold level of application performance, the shorter the determined delay time would be for such wireless device. Similarly, delay time can further be determined based on the application type, such as whether the application is a relatively delay sensitive application (such as a streaming audio application a streaming video application, a voice application, and the like) or a relatively delay insensitive application (such as an email application, a messaging application, a web browsing application, and the like), where the more delay sensitive the application type, the shorter the delay time would be. Even where each of the wireless devices is receiving a multicast broadcast, each wireless device can comprise variations in the application used, processor cycles and memory requirements for decoding the broadcast, and the like.

The application requirement can further be based on its utilization or requested utilization of communication link resources, for example, an amount of data sent to or from the wireless device, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof. Further, the application requirement can be evaluated based on a traffic class indicator associated with bearer data being sent from the wireless device, such as a quality of service class indicator (QCI) or similar traffic class indicator. Thus, the second and/or third groups can be selected based on the number of retransmission requests sent by each wireless device, and a respective application requirement for each wireless device. Thus, the delay time can further be determined based on the application requirement of the application running on each of the plurality of wireless devices.

Additionally, conditions of the communication link between each wireless device and the access node (e.g., communication links 416, 418 and 420) can be considered when determining the delay time for each wireless device, since as communication link conditions decrease, the need for data retransmissions can be expected to increase. In addition, a location and mobility of each of the plurality of wireless devices can be used in the determination of the delay time for each wireless device, since the farther a wireless device is located from a serving access node, and if the wireless device is moving away from the access node, the poorer the communication link will be and thus the greater the number of data retransmissions a wireless device may require.

A priority class of each of the plurality of wireless devices can also be taken into account when determining the delay time for each wireless device. For example, a wireless device can be associated with a level of priority provisioned within communication system 400 for the wireless device, such as may be associated with a premium-level subscriber, an emergency responder, and the like. A higher priority wireless device may receive a shorter delay time as compared to a wireless device associated with a lower provisioned priority level. Additionally, a traffic class indicator of data associated with the application running on each of the plurality of wireless devices, such as a quality of service class indicator (QCI), can be taken into account when determining the delay time for each wireless device. The higher the traffic class indicator, the shorter the determined delay time will be for a wireless device.

Next, in operation 510, when it is determined that a data packet is not received at one or more wireless devices of the first group, a timer is started at the one or more wireless devices of the first group using the delay time determined for each of the respective one or more wireless devices. For example, it can be determined that a data packet is not received by wireless devices 402, 404 and 406. Because wireless devices 402-406 are receiving a multicast transmission, each of wireless devices 402-406 expect to receive versions of the same data packet (i.e., a substantially identical copy of a data packet of the information being transmitted in the multicast transmission). The data packet to each wireless device can be lost over a wireless communication link so that it does not arrive at a wireless device, or the data packet can be corrupted so that the data packet cannot be properly decoded at the receiving wireless device, and the like. When each of wireless devices 402-406 determines that the data packet has not been received, rather than immediately sending a retransmission request, each of wireless devices 402-406 starts a timer using the delay time determined for each wireless device. While each timer is running, the respective wireless device is prevented from sending a retransmission request (operation 512). In an embodiment, when a delay time is determined for each wireless device, each wireless device is also instructed not to send a retransmission request until the timer using the delay time expires.

When the shortest delay time expires, another retransmission request is received from a wireless device comprising a shortest delay time of the one or more wireless devices (operation 514). For example, the delay time determined for wireless device 402 may be the shortest from among wireless devices 402-406. When its timer expires, wireless device 402 can send a retransmission request to access node 408. Similarly, when the delay time of wireless device 402 expires, the timers of wireless devices 404 and 406 are still running, and thus wireless devices 404 and 406 do not send a retransmission request.

Subsequently, the data packet which was not received is retransmitted to each of the plurality of wireless devices (operation 516). For example, when the retransmission request is received at access node 408, access node 408 retransmits the data packet to each wireless device receiving the multicast broadcast, including wireless device which have not yet sent a retransmission request, as well as wireless devices which received the data packet and were able to properly decode it. In the latter case, wireless device can be configured to disregard or discard retransmissions of data packets which were properly decoded.

In operation 514, described above, another retransmission request is received from a wireless device comprising a shortest delay time of the one or more wireless devices. It is possible that, due to wireless device mobility, changing wireless communication conditions, and the like, that the wireless device comprising the shortest delay time, and thus the wireless device from which the retransmission request is received, is in the third group of wireless devices and not in the second group. When it is determined that the retransmission request is received from a wireless device in the third group, the delay time for each wireless device in the first group (i.e., in both the second and third groups) is re-determined (operation 518). The delay time for each wireless device in the first group can be re-determined based on a second number of at least one retransmission request from each wireless device in the first group, wherein the re-determined delay time determined for each wireless device in the first group increases as the number of the at least one retransmission request of each wireless device decreases.

Figure 6:
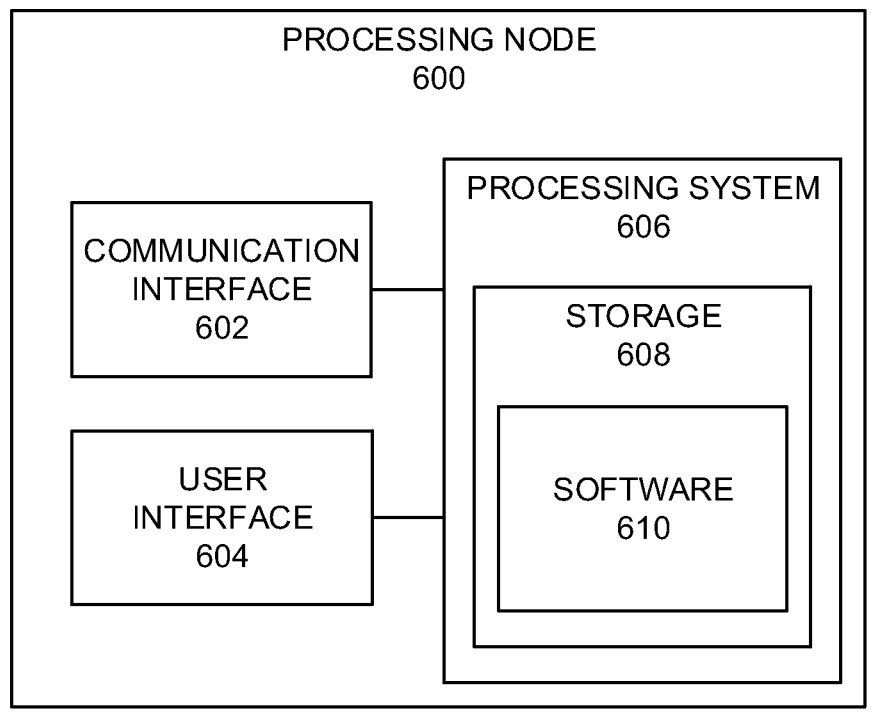
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to manage signaling overhead in a wireless multicast system. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 108, access node 408, and controller node 410. Processing node 500 can also be an adjunct or component of a network element, such as an element of access node 108, access node 408, or controller node 410. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing signaling overhead in a wireless multicast system, comprising:
   receiving at least one retransmission request from each of a plurality of wireless devices, wherein the plurality of wireless devices is receiving a multicast broadcast from an access node;
   determining a number of retransmission requests received from each of the plurality of wireless devices;
   selecting from among the plurality of wireless devices a first group of wireless devices, the first group comprising a second group of wireless devices and a third group of wireless device, wherein the number of retransmission requests of each of the wireless devices of the second group are within a first range, and the number of retransmission requests of each of the wireless devices of the third group are within a second range which is less than the first range;

determining a delay time for each wireless device in the first group based on the respective number of retransmission requests from each wireless device, wherein the delay time increases as the number of retransmission requests decreases;

starting a timer at one or more wireless devices of the first group using the delay time determined for each respective one or more wireless devices when it is determined that a data packet is not received at the one or more wireless devices; and receiving another retransmission request from a wireless device comprising a shortest delay time of the one or more wireless devices when the shortest delay time expires.

2. The method of claim 1, further comprising retransmitting the data packet which was not received to each of the plurality of wireless devices.

3. The method of claim 1, further comprising preventing the one or more wireless devices from sending a retransmission request during the respective delay time of each wireless device.

4. The method of claim 1, further comprising selecting the second group of wireless devices based on an application requirement of an application running on each of the plurality of wireless devices.

5. The method of claim 4, further comprising selecting the second group of wireless devices based on the application requirement and at least one of conditions of a wireless link between each of the plurality of wireless devices and the access node, a location and mobility of each of the plurality of wireless devices, a priority class of each of the plurality wireless device, and a traffic class indicator of data associated with the application running on each of the plurality of wireless devices.

6. The method of claim 1, further comprising:
determining that the another retransmission request is received from a wireless device in the third group; and
re-determining a delay time for each wireless device in the first group based on a second number of at least one retransmission request from each wireless device in the first group, wherein the re-determined delay time determined for each wireless device in the first group increases as the number of the at least one retransmission request of each wireless device decreases.

7. The method of claim 1, further comprising selecting from among the plurality of wireless devices the first group of wireless devices, wherein the wireless devices of the first group each comprise a number of retransmission requests which meets a threshold number of retransmission requests.

8. A method of managing signaling overhead in a wireless multicast system, comprising:
receiving at least one retransmission request from each of a plurality of wireless devices, wherein the plurality of wireless devices is receiving a multicast broadcast from an access node;
determining a number retransmission requests received from each of the plurality of wireless devices;
selecting from among the plurality of wireless devices a subset of wireless devices, wherein the number of retransmission requests of each of the wireless devices of the subset meets a threshold number of retransmission requests;
determining a delay time for each wireless device in the subset based on the respective number of retransmission requests from each wireless device, wherein the delay time increases as the number of retransmission requests decreases;

starting a timer at one or more wireless devices of the subset using the delay time determined for each respective one or more wireless devices when it is determined that a data packet is not received at the one or more wireless devices; and receiving another retransmission request from a wireless device comprising a shortest delay time of the one or more wireless devices when the shortest delay time expires.

9. The method of claim 8, further comprising retransmitting the data packet which was not received to each of the plurality of wireless devices.

10. The method of claim 8, further comprising preventing the one or more wireless devices from sending a retransmission request during the respective delay time of each wireless device.

11. The method of claim 8, further comprising selecting the subset of wireless devices based on an application requirement of an application running on each of the plurality of wireless devices.

12. The method of claim 11, further comprising selecting the subset of wireless devices based on the application requirement and at least one of conditions of a wireless link between each of the plurality of wireless devices and the access node; a location and mobility of each of the plurality of wireless devices; a priority class of each of the plurality wireless device, and a traffic class indicator of data associated with the application running on each of the plurality of wireless devices.

13. A system of managing signaling overhead in a wireless multicast system, comprising:
a processing node configured to:
receive at least one retransmission request from each of a plurality of wireless devices, wherein the plurality of wireless devices is receiving a multicast broadcast from an access node;
determine a number retransmission requests received from each of the plurality of wireless devices;
select from among the plurality of wireless devices a first group of wireless devices, the first group comprising a second group of wireless devices and a third group of wireless device, wherein the number of retransmission requests of each of the wireless devices of the second group are within a first range, and the number of retransmission requests of each of the wireless devices of the third group are within a second range which is less than the first range;
determine a delay time for each wireless device in the first group based on the respective number of retransmission requests from each wireless device, wherein the delay time increases as the number of retransmission requests decreases;
instruct the starting of a timer at one or more wireless devices of the first group using the delay time determined for each respective one or more wireless devices when it is determined that a data packet is not received at the one or more wireless devices; and
receive another retransmission request from a wireless device comprising a shortest delay time of the one or more wireless devices when the shortest delay time expires.

14. The system of claim 13, wherein the processing node is further configured to retransmit the data packet which was not received to each of the plurality of wireless devices.

15. The system of claim 13, wherein the processing node is further configured to prevent the first group of wireless devices from sending a retransmission request during the respective delay time of each wireless device.

16. The system of claim 13, wherein the processing node is further configured to select the first group of wireless devices based on an application requirement of an application running on each of the plurality of wireless devices.

17. The system of claim 16, wherein the processing node is further configured to select the second group of wireless devices based on the application requirement and at least one of conditions of a wireless link between each of the plurality of wireless devices and the access node, a location and mobility of each of the plurality of wireless devices, a priority class of each of the plurality wireless device, and a traffic class indicator of data associated with the application running on each of the plurality of wireless devices.

18. The system of claim 13, wherein the processing node is further configured to:
   determine that the another retransmission request is received from a wireless device in the third group; and
   re-determine a delay time for each wireless device in the first group based on a second number of at least one retransmission request from each wireless device in the first group, wherein the re-determined delay time determined for each wireless device in the first group increases as the number of the at least one retransmission request of each wireless device decreases.

19. The system of claim 13, wherein the processing node is further configured to select from among the plurality of wireless devices the first group of wireless devices, wherein the wireless devices of the first group each comprise a number of retransmission requests which meets a threshold number of retransmission requests.

* * * * *